Jan. 24, 1967  H. G. KRAUT  3,299,604
METHOD OF PACKAGING
Filed Nov. 19, 1963  2 Sheets-Sheet 1
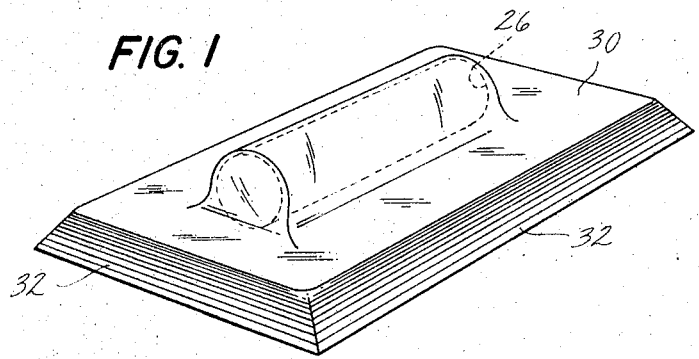
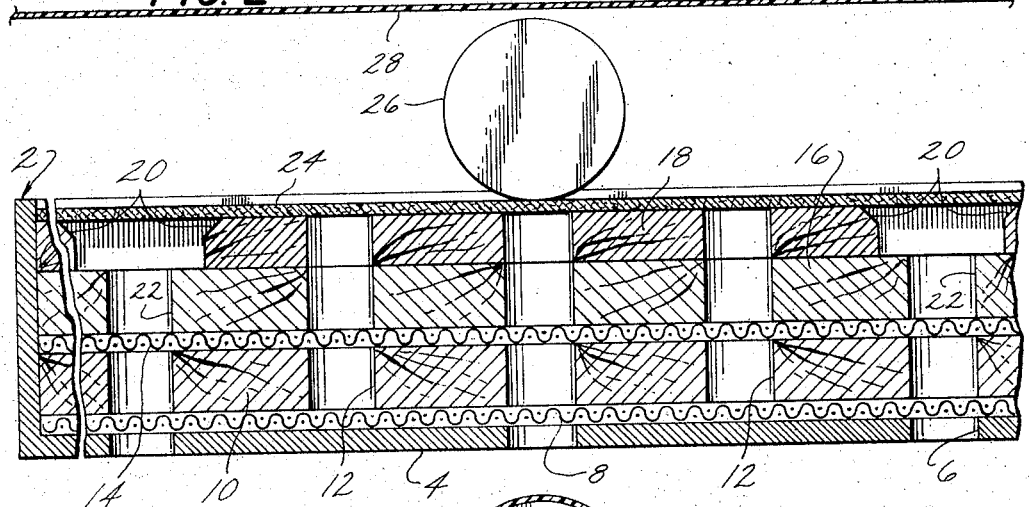
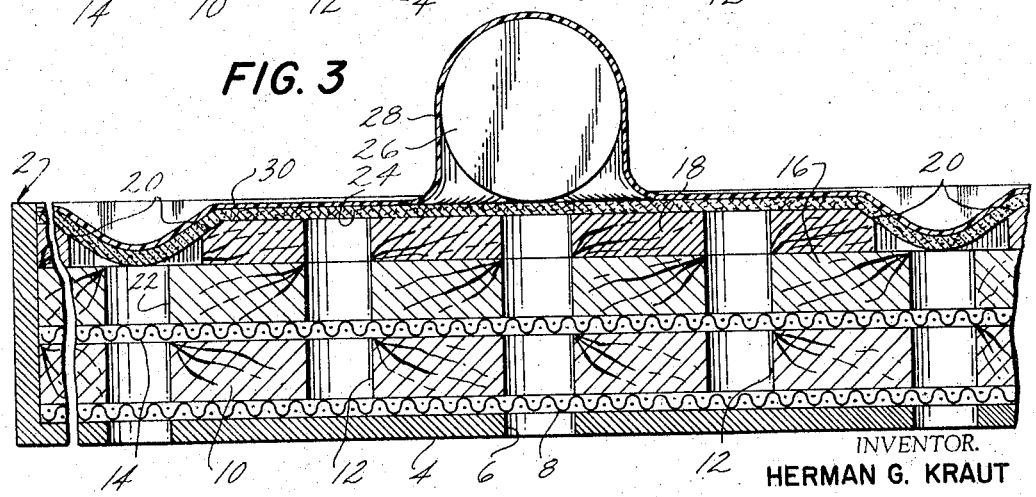
INVENTOR.
HERMAN G. KRAUT
BY
*Peter L. Costas*
ATTORNEY Jan. 24, 1967   H. G. KRAUT   3,299,604
METHOD OF PACKAGING
Filed Nov. 19, 1963   2 Sheets-Sheet 2

INVENTOR.
HERMAN G. KRAUT
BY
ATTORNEY 3,299,604
METHOD OF PACKAGING
Herman G. Kraut, New Britain, Conn., assignor to The Stanley Works, New Britain, Conn., a corporation of Connecticut
Filed Nov. 19, 1963, Ser. No. 324,684
13 Claims. (Cl. 53—22)

The present invention relates to packaging, and, more particularly, to a method for packaging articles between a film of synthetic thermoplastic sheet material and a substrate to form a composite package.

In United States Patent Number 3,031,072, granted April 24, 1962, and entitled Package and Method of Forming Same, there is described a package having an article supported on a paperboard substrate and sheathed by a thermoplastic film which is drawn thereabout and bonded to the substrate about the article by its own substance, and the method of making the package. A similar method and article additionally employing an adhesive coating or laminate upon the substrate or film has been widely employed prior to the invention of the aforementioned patent, which method and article are described in many patents including United States Patent Number 2,855,735, granted October 14, 1958, and United States Patent Number 2,861,405, granted November 25, 1958. This general method of packaging using a sheathing film and a supporting substrate has commonly become known as "skin-packaging."

Packages produced by skin-packaging are subject to dog-earing and curling due to contraction of the plastic film upon cooling thereof following bonding to the substrate and due to the dimensional instability or variation in resistance to tensional forces inherent in some substrate materials such as paperboard and caused by variation in atmospheric conditions such as humidity. Such curling and dog-earing is particularly disadvantageous in packaging for point-of-sale merchandising because it reduces the attractiveness of the package and is pronounced in packages using relatively thin substrate materials.

It is an object of the present invention to provide a method of skin-packaging articles to form an attractive composite package which is substantially resistant to curling.

It is also an object to provide such a method which may be adapted by relatively facile and economical modifications to existing skin-packaging machinery.

Another object is to provide relatively inexpensive means for adapting skin-packaging machinery to the production of attractive and curl-resistant cards.

Other objects and advantages will be readily apparent from the following detailed description and claims and the attached drawings wherein:

FIGURE 1 is a perspective view of a composite package embodying the present invention;

FIGURE 2 is a fragmentary sectional view of a support assembly embodying the present invention with a paperboard substrate supported thereon and with an article placed on the substrate prior to bonding of thermoplastic film thereto;

FIGURE 3 is a similar sectional view after the thermoplastic film has been bonded to the paperboard substrate and the substrate has been drawn into general conformity with the upper surface of the support assembly;

Figure 4:
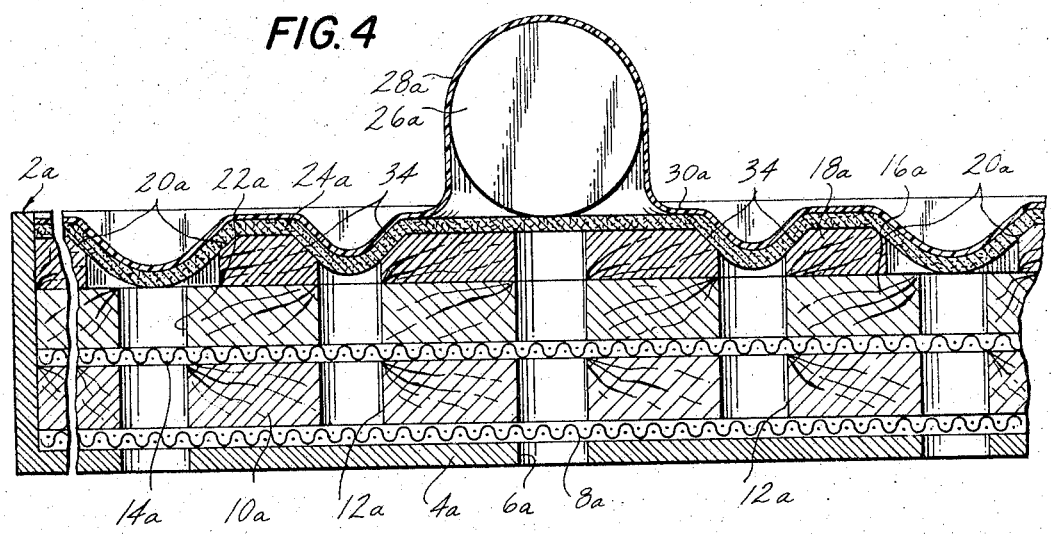
FIGURE 4 is a fragmentary sectional view of another support assembly embodying the present invention after the substrate and film have been generally conformed to the upper surface of the support member.

It has now been found that the foregoing and related objects may be readily attained in a method of skin-packaging wherein an air-pervious fibrous substrate is placed upon the upper surface of an air-pervious support member having a support portion extending substantially in a single plane and a molding portion extending away from the plane. The support member is pervious to air at both of said surface portions. An article to be packaged is placed on the upper surface of the substrate overlying the support portion and a length of synthetic thermoplastic film, supported adjacent its margins in a position overlying the article and substrate, is heated to deformability. Suction is drawn through the air-pervious support member and substrate while the deformably heated film is supported in a position closely overlying the substrate and article to draw the film into a sheath about the article and into laminar contact and bonding engagement with the upper surface of the substrate about the article to form a composite package. As the bonded film renders the previously pervious substrate substantially impervious to air, the continuing suction draws the bonded substrate and film into general conformity with the molding portion of the upper surface of the support member to effect substantially a relatively permanent contour in the bonded substrate and film of the composite package produced thereby.

Although the method of the present invention may be utilized with adhesive coatings or laminates upon the substrate or film, the method of applicant's aforementioned United States Patent Number 3,031,072 is preferably utilized for optimum economy and most facile operation.

The substrate may be formed to an appreciable degree without the moistening thereof prior to the forming operation, but it has been found that moistening of the lower surface of the substrate greatly enhances the operation of the method by producing greater conformity and greater rigidity in the formed contour. Although the theory of operation is not completely understood, it is believed that moistening of the lower surface of the substrate causes cellulosic fibers to swell and permits them to be reoriented under the molding pressure of the vacuum, the slippage and orientation apparently increasing the strength in the formed area. Presumably, the moisture inherently present in a cellulosic fiber card permits some measure of this orientation. It is not essential, and in fact not desirable, that all the moisture in the substrate be removed but the heat and vacuum of the skin-packaging operation generally drives off the undesirable excess moisture.

Various fibrous materials may be employed for the substrate which will permit the desired molding of the substrate such as regenerated cellulose and various synthetic fibers used for making synthetic papers. However, the preferred substrate fibers are cellulosic and most desirably natural cellulosic fibers used for making papers such as wood pulp, hemp, jute and caroa from the standpoint of cost and optimum operation. Such fibers rely upon microscopic fibrillae for bonding in what is known as "papermaker's bond" and permit the highly desired reorientation upon wetting and/or swelling.

Although perforated, relatively low porosity fibrous materials may be employed for the air-pervious substrate where adhesive coatings or laminates are employed to effect bonding, the preferred and ideal substrates are porous paperboard sheet materials which will permit the drawing of a vacuum therethrough and which preferably are free from an adhesive coating. Most desirably, the paperboard is only lightly calendered to preserve the inherently porous, gas-permeable nature throughout which provides optimum bonding throughout the area of laminar contact with the film. A suitable paperboard stock, for example, is the type known in the trade as "patent coated" which has a face or top layer composed essentially of virgin pulp and high grade waste free of ground wood and presenting an attractive finish and appearance. Alternatively, other types of porous paperboard sheet material including corrugated board may be employed. In the event a colored background or base color is to be used to provide an attractive appearance, it is most desirable to select a paperboard sheet material which has been vat dyed with the desired color during its manufacture to eliminate the necessity for printing the background color upon the paperboard.

When the bonding of the film to the paperboard is by the substance of the film itself as set forth in applicant's aforementioned patent, care should be taken to select printing inks for the paperboard which will not unduly interfere with the bonding process since certain inks contain sufficiently high quantities of binders or fillers to interfere with the porosity of the paperboard stock or to otherwise interfere with the bonding operations. Similarly, when the bonding of the film is by the substance of the film itself, the substrate should be substantially imperforate in the area of laminar contact to achieve optimum uniformity of bonding throughout the area of laminar contact. However, incidental perforations may also be incorporated for purposes of hanging the packages, or for tearing the substrate by the user to open the package, or about the article to permit more rapid draw of the film about the article into a sheath as may be desirable when the article is large and requires a large degree of draw. Where an adhesive coating or laminate is employed to effect the bond, the substrate may be nonporous and the area of surface contact may contain perforations as are often utilized to permit drawing a vacuum therethrough. In either instance, the substrate should be of sufficient rigidity for the packaging application.

Although the above method may be desirably employed with films having an adhesive coating or laminate, the most desirable films employed are polyolefins having at least their lower surface at least partially oxidized or surface-treated to render the lower surface more susceptible to activation by heat than the body of the film as disclosed and claimed in applicant's aforementioned United States Patent Number 3,031,072. Generally, such films may have their surface oxidized during the process of extrusion, electrostatically, chemically or flame-treated, or otherwise treated to provide the desired surface characteristics.

The films used for the present invention may be of a thickness of about 2 to 11 mils, and preferably about 3 to 7 mils, depending upon the degree of distention or draw required to form the sheath about the article and the weight of the article. Heavier gauge films may be employed albeit with greater cost and longer periods of heating to achieve the desired deformability. The preferred films are surface-treated polyolefins as described in applicant's aforementioned patent, and particularly, surface-treated polyethylene films of about 3 to 7 mils in thickness.

The suction applied to the molding element and substrate should be sufficient to distend the film into a tight-fitting sheath about the articles and to draw the film into tight surface contact with the substrate, a swell as to draw the bonded film and substrate into general conformity with the molding portion of the upper surface of the support member. In the instance of the method of the aforementioned United States Patent Number 3,031,072, the suction should be sufficient to draw the surface of the film into the pores of the paperboard. In a commercial embodiment, such rated at about 23 inches of mercury (about 11.5 pounds per square inch) has proven highly satisfactory. The actual amount of suction required will vary with the permeability or porosity and the rigidity of the substrate and the conditions of operation. Generally, the suction is applied for about two to twenty seconds to bring the film and substrate into laminar engagement, with a relatively short additional interval being needed to complete the shaping of the film and substrate lamination. A total period of about three to ten seconds is satisfactory for most operations.

Although the molding portion of the upper surface may extend upwardly from the plane of the support portion, generally the difficulties in providing firm support for the article being packaged prior to drawing the substrate into conformity with the upper surface of the support member and in effectively drawing the vacuum when the substrate is spaced from the major or support portion of the upper surface militate against such a configuration for the support member surface. Accordingly, the preferred support member surface is one in which the molding portion extends downwardly from the support portion in the form of a depression.

The molding portion may comprise one or more discontinuous linear surface portions but preferably comprises a continuous surface portion circumscribing the support portion to provide a peripheral stiffening rib about the composite package. If so desired, a plurality of spaced continuous molding portions circumscribing the support portion may be provided or a circumscribing molding portion may be combined with one or more discontinuous linear molding surface portions to provide additional corrugations extending inwardly towards the packaged article, either commencing at the circumscribing molding portion or at a point spaced therefrom. Thus, a high-strength marginal corrugation may be combined with spoke-like corrugations for enhanced strength, particularly where the support portion is relatively large and the article relatively heavy. The preferred molding portion comprises a circumscribing depression having side surfaces inclined downwardly and outwardly from the adjacent support portion to provide a generally outwardly bevelled marginal portion extending about the package for both attractiveness and high strength.

Although the substrate and support member may be dimensioned to provide a single composite package in each cycle, the support member preferably has a multiplicity of areas providing support portions and spaced apart by a multiplicity of depressions so that a substrate dimensioned to cooperate with the support member may have placed therein a multiplicity of articles to form a multiplicity of composite packages in a single cycle. The packaging assembly produced by the operation is cut into individual packages, preferably along the center of the molded depressions which are dimensioned to provide the contoured edge portion of adjacent packages.

Regardless of the configuration employed, it is apparent that the substrate must effectively cooperate with the support member to permit effective application of a vacuum to the bottom surface thereof both for the bonding of the film and for the subsequent molding of the substrate and film.

Figure 6:
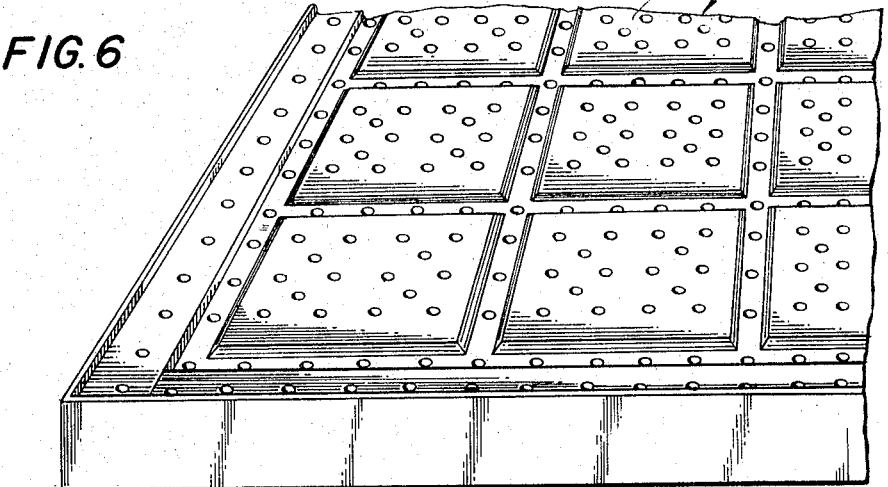
FIGURE 6 is a fragmentary perspective view to a reduced scale of the support assembly of FIGURE 2 illustrating the pattern of the upper surface thereof to form a plurality of individual composite packages.

Referring now in detail to the attached drawings, FIGURE 6 fragmentarily illustrates a support assembly or member embodying the present invention and generally designated by the numeral 2. As best seen in FIGURES 2 and 3, the support assembly 2 includes a metal tray 4 having a multiplicity of perforations 6 spaced thereabout, a lower screen element 8, a lower fibrous spacing member 10 having a multiplicity of perforations 12 therein, an upper screen element 14, and a superposed molding member including the fibrous base element 16 and the multiplicity of fibrous molding elements 18 secured upon the upper surface thereof by adhesive or other suitable means (not shown).

The molding elements 18 have outwardly and downwardly inclined bevelled edges 20 providing a peripheral depression acting as a molding portion relative to the planar or major support portion of the upper surface. Adjacent molding elements 18 are spaced apart slightly and their opposing bevelled edges 20 cooperate with the spacing therebetween to provide a relatively large molding depression between adjacent support surface portions. The molding member is provided with a multiplicity of perforations 22 which are disposed at the planar support portions and at the spacing between molding elements 18 so that the molding member is pervious to air both at the molding and support portions.

Referring now to FIGURE 2, a porous paperboard substrate 24 has been placed upon the molding member of the support assembly 2 and an article 26 to be packaged has been placed upon the substrate 24 in a position overlying the support or planar portion of the molding element 18.

In FIGURE 3, the skin-packaging subassembly of FIGURE 2 has been placed in a position closely underlying a length of thermoplastic film 28 which has been heated to deformability by a heater (not shown). A vacuum has been applied to the bottom of the support assembly 2 by a pump (not shown) and thence to the porous substrate 24 through the perforations 6, 12 and 22 and the screen elements 8, 14. As the suction is drawn through the porous substrate 24, the deformably heated film 28 is drawn into a sheath about the article 26 and into laminar contact and bonding engagement with the upper surface of the substrate 24 about the article 26.

After the film 28 has bonded to the substrate 24 and provided a relatively air-impervious composite, the continuing application of vacuum to the lower surface of the substrate 24 then draws the composite downwardly into the depression between the planar support portions of the molding elements 18 and generally along the bevelled edge 20 thereof. The composite of film 28 and substrate 24 bridges the spacing between adjacent molding elements 18 and generally conforms to the depression to produce the configuration shown in FIGURE 3.

The skin-packaging assembly of FIGURE 3 is then severed along the center lines of the molded contours to produce the composite package of FIGURE 1 wherein the composite of film and substrate are configured to provide a planar support portion 30 and a peripheral bevelled edge portion 32. The resultant structure is not only highly attractive but also extremely resistant to curling even in relatively moist atmospheres.

Figure 5:
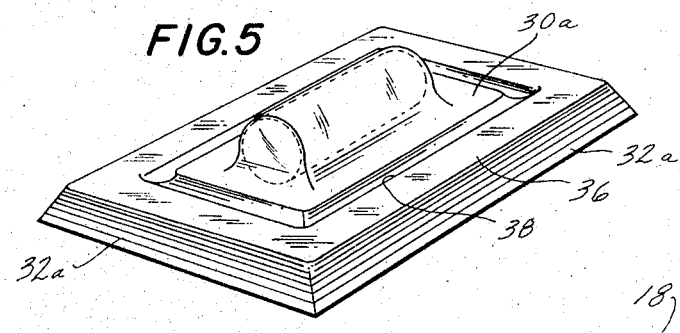
FIGURE 5 is a perspective view of a composite package formed by the support member of FIGURE 4.

Turning now to the embodiment of FIGURES 4 and 5, the structure of the support assembly is generally similar to that of FIGURES 2, 3 and 6 except that a circumscribing groove or depression 34 acting as an additional molding portion of the upper surface is provided in the molding elements 18a inwardly of the bevelled edges 20a and symmetrical therewith. By varying the width of the groove 34, the degree of vertical displacement and molding may be varied. The resultant structure of the composite package is highly attractive in appearance, the planar portion 36 between the internal groove portion 38 and the bevelled edge portion 32a acting as a frame for the article 26a. The double rib produces enhanced rigidity which may be particularly desirable for heavier weight articles or for relatively large areas.

The molded portions of the composite packages may be varied both for appearance and for obtaining optimum rigidity and resistance to curling. The higher strength which may be obtained by the method of the present invention permits the use of thinner sheet materials for the substrate without sacrificing strength and durability of the package. By providing a bevelled edge upon the package, an illusion of relatively large thickness is created.

The air-pervious support assembly for use in existing apparatus may be provided readily and economically by a composite structure similar to that in the attached drawings. However, if so desired the support assembly or the upper portion thereof may be molded or machined from a porous or air-pervious material such as synthetic plastic foams or from other materials which are perforated to povide the desired air-flow therethrough.

Exemplary of the efficacy of the present invention is the following specific example.

EXAMPLE

A substrate of porous, patent-coated paperboard of about 0.032 inch was moistened on its back surface with water by a roll-coating mechanism and placed upon the upper surface of a support assembly generally similar to that illustrated in FIGURES 2, 3 and 6 of the drawings. The molding elements were about 3/16 inch in height and were glued upon a pegboard base member. Each of the molding elements had about six 1/4 inch diameter holes distributed about the planar portion and an outwardly and downwardly bevelled peripheral edge of about 1/16 inch in depth and at a 45 degree angle to the planar surface. The molding elements were spaced about 1/2 inch apart and apertures in the pegboard communicated with the spacing therebetween.

Bottles of cosmetic makeup were placed upon the substrate at predetermined (printed) positions registering with the planar porions of the molding elements. The skin-packaging subassembly thus produced was introduced into skin-packaging apparatus generally of the type illustrated in applicant's aforementioned patent wherein a surface-treated polyethylene film of about 4 mils was heated to deformability and to activate the treated surface for bonding. The film and skin-packaging subassembly were then brought into close relationship as a vacuum of about 23 inches of mercury was applied to the bottom of the support assembly and thus to and through the substrate. The vacuum drew the film into a sheath closely conforming to the bottles and into laminar contact and bonding engagement with the substrate in the area surrounding the bottles. The vacuum cycle continued for about two seconds past the time the film bonded to the substrate and drew the composite of film and substrate into the depressions between the planar support portions of the molding elements defined by their bevelled edges and into the spacing therebetween to produce general conformity with the substrate lying closely against the bevelled edges and bridging the spacing therebetween but extending downwardly into the spacing along an angle conforming generally to the bevelled edges.

The resultant skin-packaging assembly was die-cut along the center line of the molded depressions to provide a multiplicity of composite packages with a bevelled edge circumscribing the periphery, substantially as illustrated in FIGURE 1. The packages were highly attractive, relatively rigid and substantially free from curling in moist atmosphere.

Thus, it can be seen from the foregoing detailed specification and the attached drawings that the present invention readily and economically provides attractive composite packages which are relatively rigid and substantially free from curling. The invention is easily and economically adapted to existing skin-packaging apparatus and permits wide versatility in styling, appearance and rigidity of the resultant packages.

Having thus described the invention, I claim:

1. In the method of skin-packaging articles between a substrate and a thermoplastic film to form a composite package, the steps comprising: moistening one surface of an air-pervious fibrous substrate placing said moistened substrate upon the upper surface of an air-pervious support member with its moistened surface adjacent said upper surface, said upper surface of said support member having a support portion extending substantially in a single plane and a molding portion extending away from said plane, said support member being pervious to air at both of said surface portions and said substrate overlying both of said surface portions; placing an article to be packaged upon the upper surface of said substrate overlying said support portion of said support member; supporting a length of synthetic thermoplastic film adjacent the margins thereof in a position overlying said substrate and article; heating said thermoplastic film to deformability; drawing suction through said support member and substrate while supporting the deformably heated film in a position closely overlying said substrate and article to draw said film into a sheath about said article and into laminar contact and bonding engagement with the upper surface of said substrate about said article, said suction drawing said bonded substrate and film into general conformity with said molding portion of said support member upper surface to effect substantially a permanent contour in the bonded substrate and film of the composite package produced thereby.

2. The method of claim 1 wherein said substrate is paperboard.

3. The method of claim 1 wherein said substrate is a porous paperboard and said film is a polyolefin having its lower side surface-treated and wherein said film is bonded to said substrate by its own substance without the use of adhesives and with a portion of the lower surface thereof extending into the pores of the paperboard substrate.

4. The method of claim 3 wherein said polyolefin is polyethylene and said film is about 2 to 11 mils in thickness.

5. The method in accordance with claim 1 wherein said support portion is circumscribed by said molding portion.

6. The method in accordance with claim 1 wherein said support portion is circumscribed by a plurality of spaced molding portions.

7. The method in accordance with claim 1 wherein said molding portion is a depression circumscribing said support portion.

8. The method in accordance with claim 7 wherein said depression is defined by surfaces downwardly and outwardly inclined from said support portion to provide a generally outwardly bevelled edge upon the composite package extending about a planar center portion.

9. The method in accordance with claim 7 wherein said upper surface of said support member has a multiplicity of areas providing support portions and spaced apart by a multiplicity of depressions providing molding portions and wherein a multiplicity of articles are placed upon said substrate to provide a multiplicity of composite packages upon severing of said bonded substrate and film.

10. In the method of skin-packaging articles between a substrate and a thermoplastic film to form a composite package, the steps comprising: moistening one surface of an air-pervious paperboard substrate; placing said moistened substrate upon the upper surface of an air-pervious support member with its moistened surface adjacent said upper surface, said upper surface of said support member having a multiplicity of support portions extending substantially in a single plane and a multiplicity of depressions circumscribing said support portions and providing molding portions extending away from said single plane, said support member being pervious to air at both said molding and said support portions and said substrate overlying both said molding and said support portions; placing a multiplicity of articles to be packaged upon the upper surface of said substrate overlying said support portions of said support member; supporting a length of synthetic thermoplastic film adjacent the margins thereof in a position overlying said substrate and articles; heating said thermoplastic film to deformability; and drawing suction through said support member and substrate while supporting the deformably heated film in a position closely overlying said substrate and articles to draw said film into a sheath about said articles and into laminar contact and bonding engagement with the upper surface of said substrate about said articles, said suction drawing said bonded substrate and film into general conformity with said molding portions of said support member upper surface to effect a substantially permanent contour in the bonded substrate and film of the composite packages produced thereby.

11. The method of claim 10 wherein said substrate is a porous paperboard and said film is a polyolefin having its lower side surface-treated and wherein said film is bonded to said substrate by its own substance without the use of adhesives and with a portion of the lower surface thereof extending into the pores of the paperboard substrate.

12. The method of claim 11 wherein said polyolefin is polyethylene and said film is about 2 to 11 mils in thickness.

13. The method in accordance with claim 10 wherein said depression is defined by surfaces downwardly and outwardly inclined from said support portion to provide a generally outwardly bevelled edge upon the composite package extending about a planar center portion.

References Cited by the Examiner
UNITED STATES PATENTS

| | | | |
|---|---|---|---|
| 2,855,735 | 10/1958 | Groth | 53—22 |
| 2,861,405 | 11/1958 | Hanford | 53—22 |
| 2,937,746 | 5/1960 | Ferguson | 206—78 |
| 2,950,004 | 8/1960 | Acomb | 206—78 |
| 3,031,072 | 4/1962 | Kraut | 53—22 X |

FOREIGN PATENTS

| | | |
|---|---|---|
| 616,819 | 3/1961 | Canada. |

TRAVIS S. McGEHEE, *Primary Examiner.*

GEORGE O. RALSTON, *Examiner.*

L. G. MANCENE, *Assistant Examiner.*